H. J. LEACH.
REEL.
APPLICATION FILED JULY 1, 1916.

1,214,190.

Patented Jan. 30, 1917.

WITNESSES
Frederick Diehl.

INVENTOR
H. J. Leach
BY
ATTORNEYS

UNITED STATES PATENT OFFICE.

HORACE JOHN LEACH, OF MOUNT CARMEL, ILLINOIS.

REEL.

1,214,190.  Specification of Letters Patent.  Patented Jan. 30, 1917.

Application filed July 1, 1916. Serial No. 107,000.

*To all whom it may concern:*

Be it known that I, HORACE J. LEACH, a citizen of the United States, and a resident of Mount Carmel, in the county of Wabash and State of Illinois, have invented a new and Improved Reel, of which the following is a full, clear, and exact description.

The object of the invention is to provide a new and improved reel more especially designed for the use of telephone and other companies, to permit linemen to conveniently place a coil of covered duplex wire in position on the reel and to permit of readily carrying the reel and the coil of wire about from one place to another for paying out the wire as required without danger of the wire becoming entangled.

In order to accomplish the desired result, use is made of a casing and a sectional drum mounted to turn in the said casing and formed of a conical main section and an inverted conical top section having its apex end fitting onto the apex end of the main section.

A practical embodiment of the invention is represented in the accompanying drawings forming a part of this specification, in which similar characters of reference indicate corresponding parts in both views.

Figure 1:
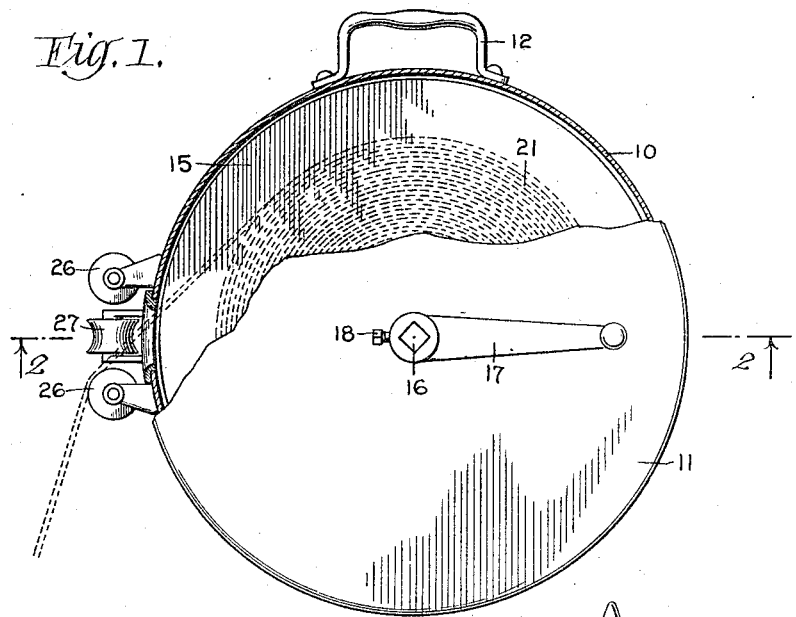
Figure 2:
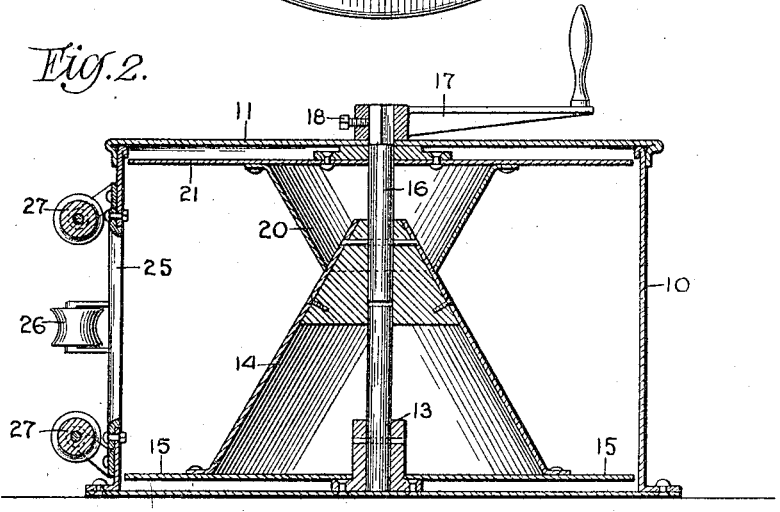

Figure 1 is a plan view with parts shown in section; and Fig. 2 is a sectional side elevation of the same on the line 2—2 of Fig. 1.

The reel casing 10 is preferably cylindrical and is provided on top with a removable cover 11, and on the side with a handle 12 for carrying the reel about. On the bottom of the casing 10 is centrally arranged a bearing 13 for a conical drum section 14 to rotate on, the said drum section 14 having at its base an annular flange 15. From the apex end of the drum section 14 extends a spindle 16 journaled in the cover 11 and projecting beyond the same for receiving a removable handle 17 or other tool to permit of conveniently turning the spindle 16 and with it the drum section 14. The handle 17 fits on the polygonal outer end of the spindle 16 and is preferably fastened in place thereon by a set screw 18.

The apex end of the drum section 14 is engaged by the apex end of a hollow inverted drum section 20 provided at its base with an annular flange 21 extending immediately below the cover 11. The flange 21 of the drum section 20 is removably held on the spindle 16.

The coil 21 of duplex wire is placed centrally in position on the cone section 14 at the time the handle 17, cover 11, and drum section 20 are removed, and then the drum section 20 is placed in position on the spindle 16 to extend into the opening of the coil held on the drum section 14. The cover 11 is next replaced and the handle 17 is engaged with the upper end of the spindle 16.

The side of the casing 10 is provided with a vertically elongated outlet 25 through which passes the duplex wire as the latter unwinds from the drum formed of the sections 14 and 20. In order to properly guide the wire use is made of pairs of guide rollers 26 and 27 journaled exteriorly on the side of the casing 10 adjacent the outlet 25, that is, with the guide rollers 26 on opposite sides of the outlet 25 and the guide rollers 27 disposed adjacent the ends of the outlet 25, as plainly indicated in the drawings. It is understood that by the arrangement described, the coil of wire 21 can be readily paid out as required by the lineman, and any slack portion can be wound on the drum by correspondingly turning the handle 17. As the wall of the opening in the coil is engaged by the conical drum sections 14 and 20 it is evident that the coil is securely held in place and readily turns with the drum when the latter is rotated by the operator turning the handle 17.

The reel shown and described is very simple in construction and can be cheaply manufactured.

The reel is especially intended for duplex drop wire such as is used by telephone and other concerns.

Having thus described my invention, I claim as new and desire to secure by Letters Patent:

1. A reel for paying out and taking up a duplex drop wire, comprising a casing, and a hollow sectional drum mounted to turn in the said casing and formed of a conical main section and an inverted conical top section having its apex end fitting onto the apex end of the main section.

2. A reel for paying out and taking up a duplex wire, comprising a cylindrical casing, a removable cover and provided at the side with an opening for the passage of the wire, a conical main drum section mounted to turn in the casing and provided at its apex with a spindle extending through the said cover, and an inverted conical drum section held centrally on the spindle and engaging with its apex end the apex end of the said main drum section.

3. A reel for paying out and taking up a duplex drop wire, comprising a casing provided at the side with an outlet opening for the wire, pairs of guide rollers journaled on the casing adjacent the sides and ends of the said outlet opening, and a sectional drum mounted to turn in the said casing and formed of a conical main section and an inverted conical top section having its apex end fitting onto the apex end of the main section.

4. A reel for paying out and taking up a duplex wire, comprising a cylindrical casing having a removable cover and provided at the side with an opening for the passage of the wire, a conical main drum section mounted to turn in the casing and provided at its apex with a spindle extending through the said cover, and an inverted conical drum section held centrally on the spindle and engaging with its apex end the apex end of the said main drum section, the said drum sections being provided with annular flanges.

HORACE JOHN LEACH.

Copies of this patent may be obtained for five cents each, by addressing the "Commissioner of Patents, Washington, D. C."